June 22, 1943.  H. W. NOWKA  2,322,539
MECHANICAL MOVEMENT
Filed March 22, 1940   4 Sheets-Sheet 1

INVENTOR.
Hans Werner Nowka
BY
ATTORNEY.

June 22, 1943.   H. W. NOWKA   2,322,539
MECHANICAL MOVEMENT
Filed March 22, 1940   4 Sheets-Sheet 2
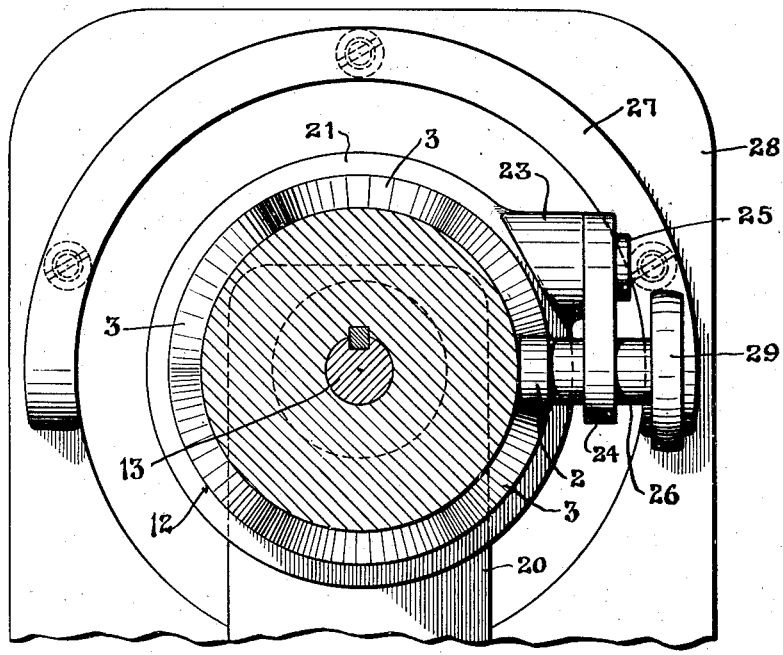
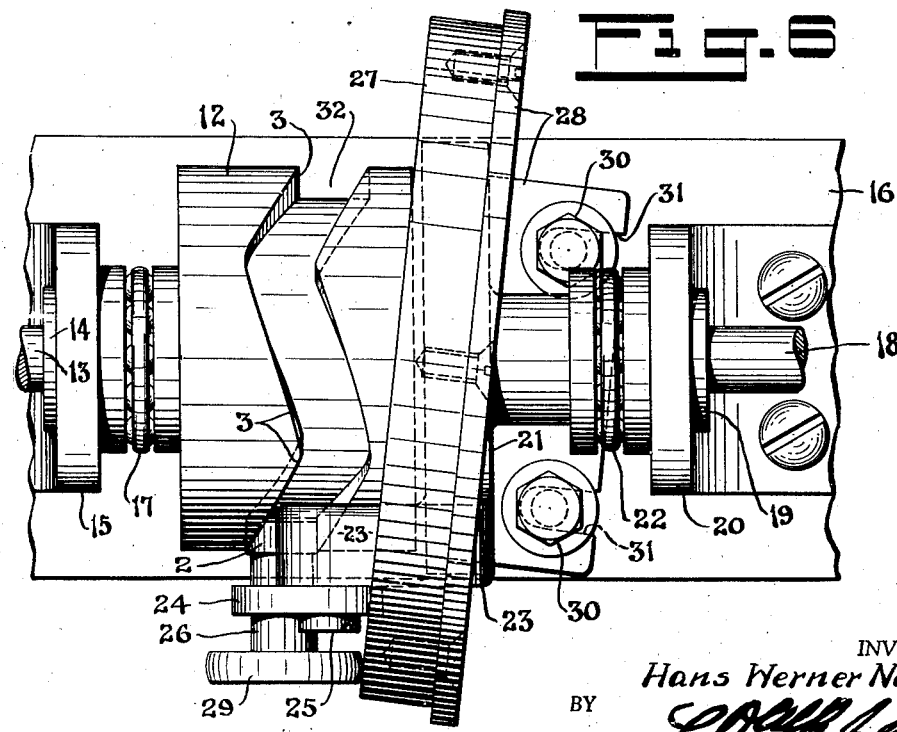
INVENTOR.
Hans Werner Nowka
BY
ATTORNEY.

June 22, 1943.                H. W. NOWKA                2,322,539
                          MECHANICAL MOVEMENT
                          Filed March 22, 1940          4 Sheets-Sheet 3

INVENTOR.
Hans Werner Nowka
BY
ATTORNEY.

June 22, 1943.  H. W. NOWKA  2,322,539
MECHANICAL MOVEMENT
Filed March 22, 1940  4 Sheets-Sheet 4
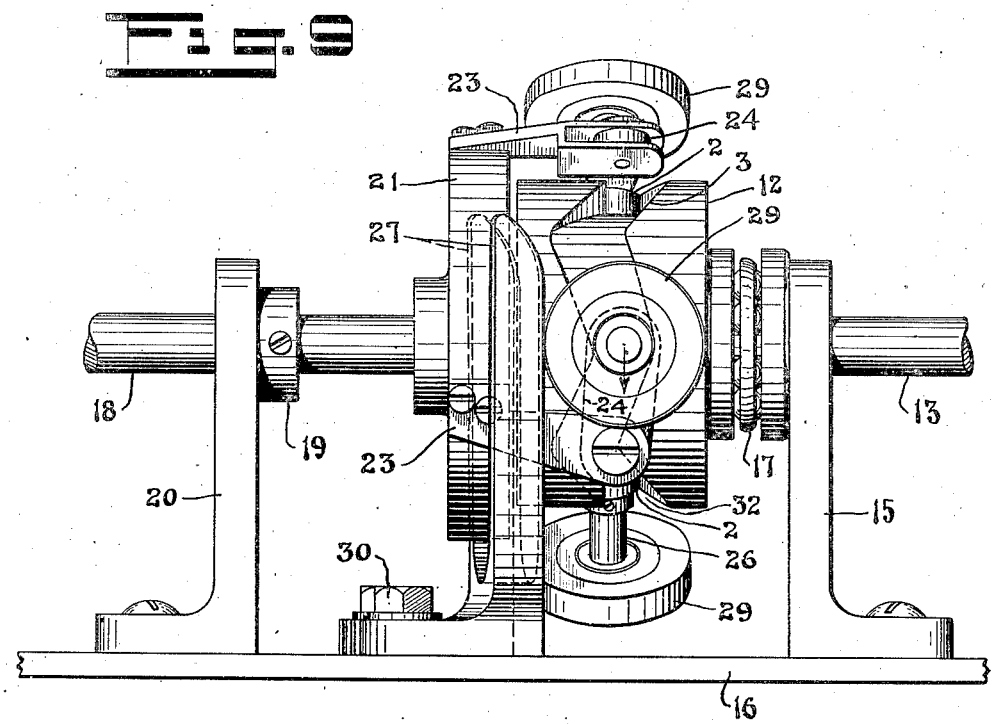
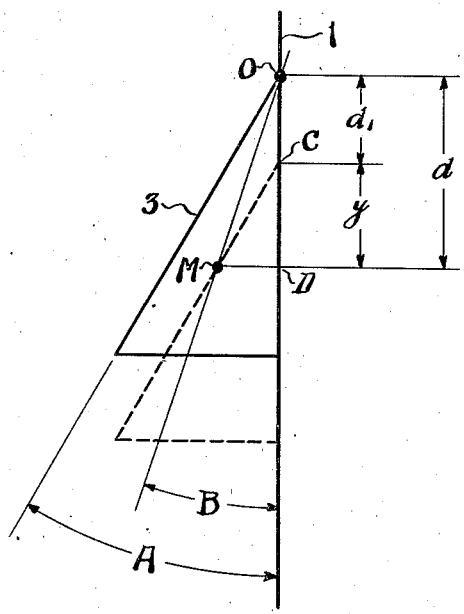
INVENTOR.
Hans Werner Nowka
BY
ATTORNEY.

Patented June 22, 1943

2,322,539

UNITED STATES PATENT OFFICE 2,322,539

MECHANICAL MOVEMENT

Hans Werner Nowka, Rockaway Park, N. Y., assignor of one-half to Oscar I. Judelshon, Park Ridge, N. J.

Application March 22, 1940, Serial No. 325,450

5 Claims. (Cl. 74—63)

This invention relates to mechanism for transmitting rotary motion from a driving member to a driven member intermittently or continuously with or without variation, and more particularly to variable speed transmission between shafts in axial alignment, and is based on the angular relation between the transmitting elements.

The invention is illustrated in the accompanying drawings, in which—

Figure 5 is a vertical cross-section of the mechanism of Figure 4 taken on the line 5—5.

Figure 6 is a top plan view; and

Figures 7, 8 and 9 are, respectively, a vertical cross-section, top plan view, and elevation of a form of mechanism embodying this principle for constant transmission at reduced speed.

Figure 10 is an additional diagram illustrating the fundamental principle of the device.

Figure 1:
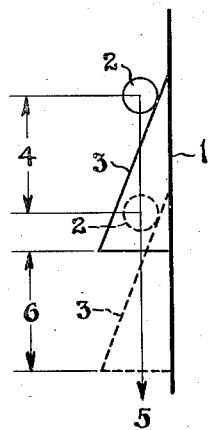
Figures 1, 2 and 3 are diagrams illustrating the principle on which the transmitting mechanism is based.
Figure 2:
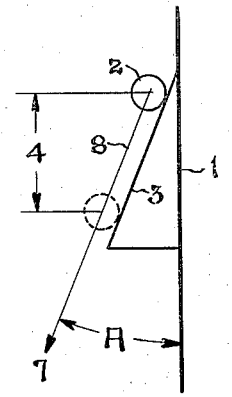
Figure 3:
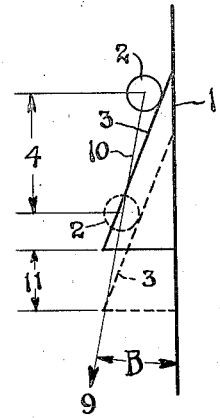

Referring to the drawings, and more particularly to Figures 1, 2 and 3, the line 1 represents a fixed surface, circle 2 a roller, and 3 represents an angular member held in sliding contact with fixed surface 1. If roller 2 is held in contact with angular surface 3 while being moved forward a distance 4 in the direction of arrow 5 and held so as to travel in a plane parallel to surface 1, the angular member 3 will be forced to move forward with the roller 2 a distance 6 equal to the distance 4 as shown in Figure 1. If, however, roller 2 is moved forward a distance 4 in the direction of arrow 7 in Figure 2 in a plane parallel to the angular surface 3, that is, in a plane having the same angular relation to fixed surface 1 as the angular surface 3, the roller 2 will roll on surface 8 without imparting forward movement to angular member 3. If on the other hand the roller 2 is moved forward a distance 4 in the direction of arrow 9 in Figure 3 in a plane having an angular relation to both surfaces 1 and 3, the roller 2 will roll on the angular member 3, but in doing so will force the member 3 forward a distance 11 which will be the resultant of the angular relation of the plane of travel 10 and the angle 3 relative to fixed surface 1.

It is evident that in these various relative movements roller 2 is the driving element, angular surface 3 is the driven element, and the fixed surface 1 is the reaction surface, along which the said driven element is forced to move, and, therefore, the aforesaid new and useful movement is expressed in the following four fundamental statements:

1. If an angular driven element slidably contacts a fixed reaction surface and a driving element moves a certain distance against the driven element in a direction parallel to the fixed surface, the said driven element is moved forward the same distance, or at a speed equal to the driving speed, or at a ratio of 1:1.

2. If an angular driven element slidably contacts a fixed reaction surface and a driving element moves a certain distance against the driven element in a direction parallel to the angular surface of the driven element, no movement is imparted to the said driven element which, therefore, is moved at zero speed or a ratio of 1:infinite.

3. If an angular driven element slidably contacts a fixed reaction surface and a driving element moves a certain distance against the driven element in a direction angular to both planes (as in Figure 3), that of the fixed surface and that of the angular surface of the driven element, the said angular driven element is moved forward a distance less than that traveled by the driving element, or at a reduced speed, the ratio of which depends upon the angularity of the direction of the driving element relative to that of the angularity of the driven element.

The actual speed ratio for any given angularities is easily determined by the relationship of these angularities and the distance traveled by the driving element. To establish the resultant forward movement of the driven element for any given angularity, reference is had to Fig. 10, in which 1 is again the fixed surface, 3 the angular driven element and angle A the angularity of the said driven element. For the sake of greater simplicity, the roller 2 is here reduced to the contact point of said driving and driven elements and point O is chosen as the initial point at the apex of angle A.

If, then, this point O has traveled forward the distance $d$ to a point M along the line 10, or in a direction forming the angle B with the fixed surface 1, the driven element has moved forward to the position shown dotted, with the apex of angle B at point C, by a distance $d_1$, which is to be established.

From the drawings, it is evident that this distance $d_1$ is the distance $d-y$, $y$ being the distance from C to the point of intersection D of the perpendicular from M to surface 1.

From triangle OMD, the side $MD = OD \times tgB = d \times tg.B$, and from triangle CMD, the side $$CD = \frac{MD}{tg.A}$$

or $$y = \frac{MD}{tg.A}$$

Substituting the value of $MD = d \times tg.B$, this expression of $y$ becomes $$y = \frac{d \times tg.B}{tg.A}$$

and the distance $$d_1 = d - y$$
$$= d - \frac{d \times tg.B}{tg.A}$$

And thereby the last fundamental statement of the new movement here applied is established in:

4. If an angular driven element, its angularity forming the driven angle, slidably contacts a fixed surface, and a driving element moves a certain or driving distance against the said driven element in a direction forming another or driving angle with the fixed surface, the said driven element is moved forward a resulting distance equal to the driving distance minus that driving distance times the tangent of the driving angle divided by the tangent of the driven angle.

In these four fundamental statements the new mechanical movement is clearly defined, which may now form the basis of any number of constructions for power transmission with either intermittent or continuous motion at any desired driven speed, including variable speed transmissions with infinite speed ratios from zero to the drive speed.

Figure 4:
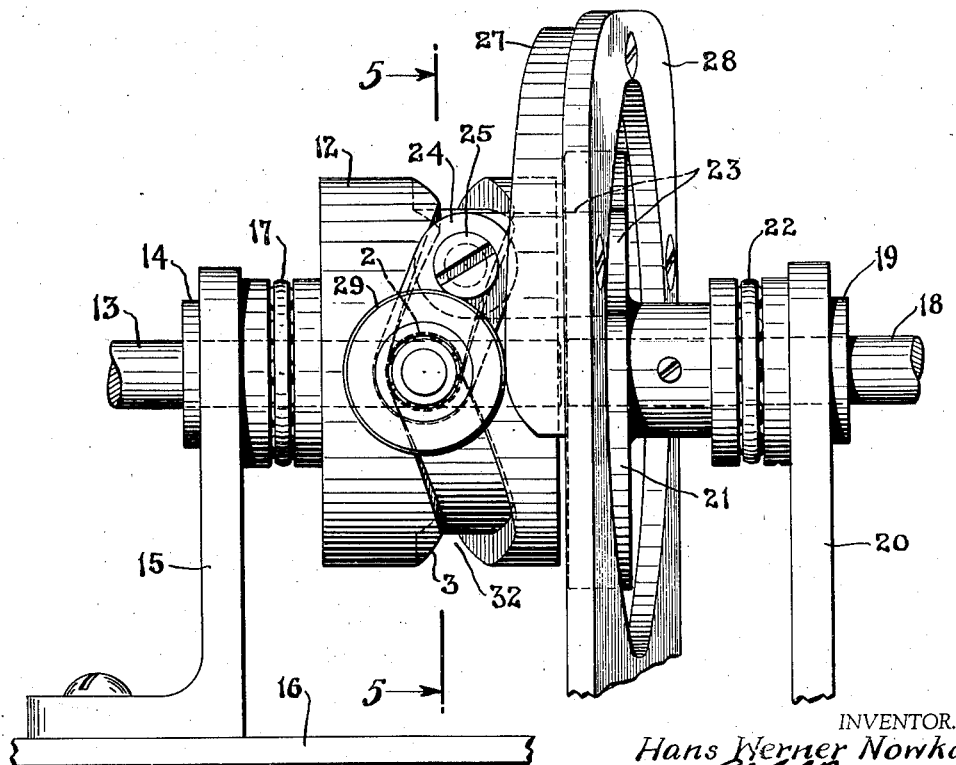
Figure 4 is an elevation of a simple form of mechanism embodying this principle for intermittent transmission at reduced speed.

A simple form of embodiment of these principles is the mechanism for intermittent motion shown in Fig. 4, Fig. 5 and Fig. 6, and which represents merely the mechanical equivalent of the elements above described. The angular driven element 3 of Fig. 1 to Fig. 3 becomes an inclined surface 3 provided in the head 12 of a driven shaft 13 journalled in bearing 14 carried by support 15 mounted in base 16. The fixed surface 1 of Fig. 1 to Fig. 3, being the reaction surface against and along which the said angular surface 3 is moved forward, becomes more conveniently a thrust bearing 17, while the roller 2 in Fig. 1 to Fig. 3 becomes a composite driving element hereinafter more fully described.

On a drive shaft 18, journalled in bearing 19 carried by support 20, a head 21 is mounted against thrust bearing 22. From this head 21, an arm 23 extends over the head 12 of the driven shaft as the prime mover of the driving element, the latter consisting of a link 24 pivoted on pin 25 provided in the arm 23 of the head 21 of the drive shaft 18. A second pin 26, best seen in Fig. 5, is rotatably mounted in said link 24, and carries the actual contacting roller 2 of the driving element, with the driven angular surface 3, and which corresponds to the roller 2 of Fig. 1 to Fig. 3.

With these parts, the three fundamental elements of Fig. 1 to Fig. 3, namely, a fixed surface, an angular driven element and a driving element, are translated into their mechanical equivalents, and there only remains to provide a means to force the direction of the driving element into any desired driving angle, as B in Fig. 3 or Fig. 10. For this purpose a reaction-guide is provided here in the simple form of a plate 27, conveniently mounted on a support 28, whose position may be adjusted by means of screws 30 in slots 31 in supports 28 to form any angle corresponding to the driving angle B in Fig. 3, so that the contact surface of 27 lies in a plane corresponding to the plane of the line 10 in Fig. 3 and Fig. 10, and since the driving element has to be in contact not only with the driven angular surface 3, but also with the said guide 27, the pin 26 of the driving element extends far enough to carry a second roller 29, contacting the surface of reaction guide 27 during the working period of the mechanism as will be more fully explained in the following description of its operation.

Before going into detailed description of this operation, however, a preliminary consideration becomes advisable. First, it is inherent in the very nature of the mechanical elements described that such an angular surface as that of the driven member 3 can not indefinitely continue, and it is therefore necessary to provide a series of such declines. And, secondly, the forward movement of the driving element is rotation, and, therefore, cannot continue in the same direction, but takes place in one direction during one-half revolution, returning in the opposite direction during the second half revolution.

However, only one of the planes, incline or decline of the angular surfaces 3 is available for the operation of the mechanism, and that during only one direction of travel of the drive member. For this reason, a series of angular surfaces 3 in the head 12 of the driven shaft 13 is provided in the form of a groove 32, one side of which forming the operating surface, while the opposite side is merely a convenient means to keep the roller 2 in continuous contact with the said working or operative surface. And, furthermore, the contact surface of the reaction guide 27 extends only over 180°, so that the roller 29 of the driving element can contact same only when moving in one direction. In the particular construction of the mechanism shown, the incline of surface 3 and the upper half revolution of drive shaft 18, have been chosen as the working period of the driving rollers 2 and 29.

With this explanation in view, the operation of the device now becomes apparent. As the drive-shaft 18, with head 21 and arm 23 rotates forward in clockwise direction from the initial position shown in the drawings, the pin 21 by means of link 24 is pulled forward, and thereby roller 2 exerts pressure on surface 3 of head 12 of driven shaft 13. This driven shaft offers resistance to that pressure and roller 2 tends to swing back and would merely roll off on surface 3, if it were possible for it to do so. However, the resisting pressure on roller 2 is transmitted by pin 26 to roller 29, and the latter is in contact with the reaction-guide 27, beyond which it cannot swing. Roller 29 is therefore forced to travel forward along the surface of reaction-guide 27. But as roller 29 moves, so moves roller 2, both being mounted concentrically on the same pin, and therefore the driving roller 2 is forced to move forward in a direction determined by the angular position of the reaction-guide 27, which corresponds to the driving angle B of Fig. 10 or Fig. 3, and the resulting forward rotation of the driven surface 3, and, therefore, the driven shaft 13 is easily determined by the rule given in the fundamental statement 4 of the movement applied.

In the foregoing, only that part of the revolution of the driveshaft has been described, which is available for the operation period of the device, and which depends not only upon the relationship of the angle of incline of surface 3 and the angle of the reaction-guide, but also upon the length of the said incline 3. For, obviously, the operative period ceases the instant roller 2 has reached the high point of the incline 3, from which point on, roller 2 will merely roll off on the decline of the angular surface, provided by groove 32, actually separating from the reaction-guide 27. This means that, from the instant the high point of the incline 3 is reached by the driving element, no further driven movement of the driven element is possible until the driving member has completed the revolution, and, on again entering the direction utilized for the forward movement of the driven member, engages again both, the inclined surface of the driven element 3 and the reaction guide 27, at which point a new working period begins. Therefore, as driveshaft 18 rotates continuously, the driven shaft is intermittently rotated forward for one working period during each revolution of the driveshaft, and the distance of travel during each working period is a function of the angle of inclination of the driven member and the direction of the driving member, and the speed at which the said driven member, and, therefore, the driven shaft is rotated forward during each working period is easily determined by the formula given above.

Figure 7:
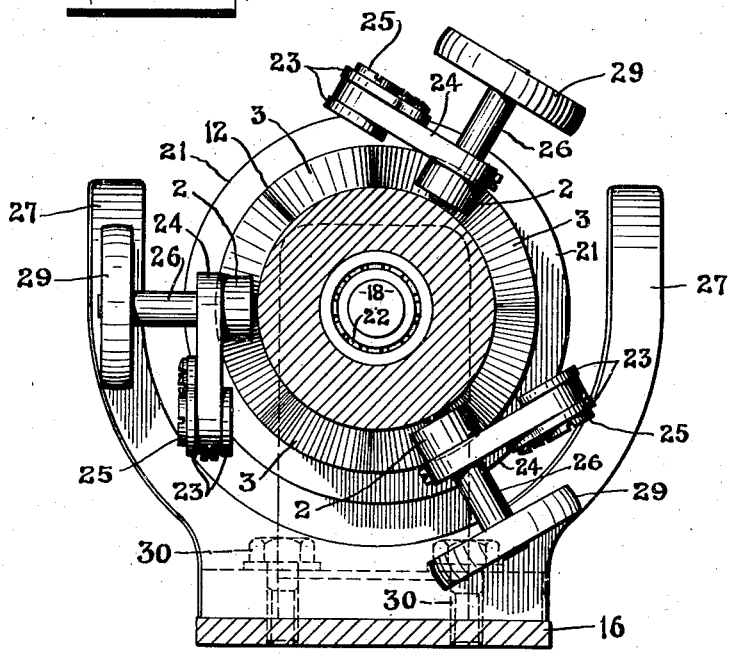
Figure 8:
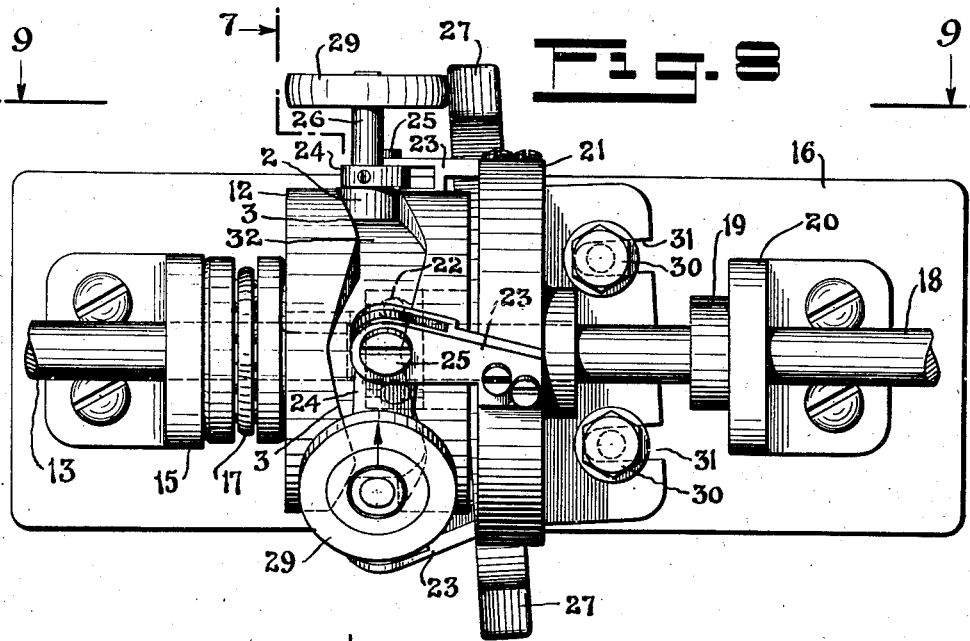

Fig. 7 to Fig. 9 illustrate a further extension of the above principles in a power transmission with continuous rotation of the driven shaft at any particular reduced speed. All the mechanical elements employed for this purpose are identical with those used in the above-described intermittent movement mechanism, with the only addition that a series of driving elements are provided instead of just one, and arranged so that at all times one of these driving elements is in operating contact while the others are inoperative.

In the following description of this unit, the same numerals are used to designate the same elements as in the former unit.

Driveshaft 18 is again journalled in bearing 19 carried in support 20 mounted on base 16. On driveshaft 18, a head is mounted again in the form of disk 21, from which, however, in this case, three arms 23 extend over head 12 of driven shaft 13, the latter again being carried by support 15 mounted on base 16. In these arms 23 are mounted the pins 25 as pivots for links 24, on the other side of which second pins 26 are provided as before, and these pins 26 carry again the same two rollers, rollers 2 in contact with the surface 3 and rollers 29 in contact with the reaction-guide 27 during the working period. This reaction guide 27 in the present construction is mounted directly on the base 16 by means of screws 30 in slots 31.

As stated above, the function of all the mechanical elements described are identical with those of the same parts in the mechanism for intermittent motion, formerly given, and therefore the description of the operation in connection with this unit also applies to the speed reducer now under consideration, with the only distinction that a continuity of drive-members is provided so that the operating period of one driving element is continuously followed by the operative period of the next driving element, with the result that the forward rotation of the drive shaft is also continuous at the particular speed for which the unit happens to be designed.

In the case illustrated in the drawings, a speed reduction from the driving shaft 18 to the driven shaft 13 at the ratio of 4:3 has been chosen as an example. For this particular ratio, three driving elements are provided, each being operative over a period of 120 degrees of revolution of the drive shaft. And, correspondingly, four inclined surfaces 3 with their corresponding declines are provided in the head 12 of driven shaft 13, the angularities of the said guide 27 being predetermined so that each 120 degrees of operating period of the driving member results in a forward rotation of the drive shaft 13 a distance corresponding to 90 degrees of the driven shaft.

Evidently, then, as one drive member completes a working period of 120 degrees, the next drive member has reached the starting point of the former working period and is then ready to follow with another working period, and as four inclines 3 are provided in the driven member, the former working period has moved the driven member forward 90 degrees, and a next starting point of the driven member is opposite the starting point of the next drive member.

Each 120 degrees of revolution of the drive shaft, therefore, rotates the driven shaft 90 degrees, or a ratio of 4:3.

Thus, the mechanism may be designed for any speed reduction ratio desired. For instance, if a speed reducer with the ratio of 20:1 be required, sixty inclines 3 would be provided in head 12 of driven shaft 13, while three drive members could again be used. The angularities of the said inclines and of the reaction-guide would then be determined according to the formula given for the new movement, so that each working period of 120 degrees of the drive shaft results in a forward rotation of the driven shaft of 6 degrees, or a complete revolution of the drive shaft, there being three working periods of 120 degrees, in three times six or 18 degrees, or a ratio of 360 divided by 18, or 20:1.

In this manner, the new movement may be used to design an intermittent movement mechanism, or a speed reducer of any desired ratio.

What I claim is:

1. In a mechanical movement, a drive shaft, a driven shaft in axial alinement with said drive shaft, an inclined surface provided on said driven shaft, a fixed outer guide member provided with an inclined surface, said last named inclined surface being at an angle different than that of the first named inclined surface, and a drive member mounted on said drive shaft in contacting engagement with both of the inclined surfaces to impart driving rotation to the driven shaft at a speed different from that of the drive shaft.

2. In a mechanical movement, a drive shaft, a drive member mounted on said drive shaft for rotation therewith and axial movement relative thereto, a fixed outer guide member having an inclined surface in contact with said drive member to impart a compound axial movement and rotation to said drive member, and a driven member in axial alinement with the drive member, said driven member having an inclined surface disposed in contact with said drive member and being at a different angle from the first named inclined surface, whereby rotation is transmitted from the drive member to the driven member at a speed different from the speed of rotation of the drive shaft.

3. In a mechanical movement, a drive shaft, a drive member mounted on said drive shaft for rotation therewith, means for imparting an axial movement to the drive member upon rotation thereof, the combined rotary movement and axial movement of the drive member defining a driving angle, a driven shaft in axial alinement with the drive shaft, a driven member fixed to said driven shaft and having an inclined surface defining a driven angle, the angle of the inclined surface being different than that of the driving angle, said drive member rotating in said drive angle and being disposed in contact with said inclined surface to impart rotation to said driven shaft at a speed depending upon the difference between the driving angle and the inclined surface defining the driven angle.

4. A mechanical movement comprising in combination, a drive shaft, a driven shaft in axial alinement with said drive shaft, a head fixed to said driven shaft having an angular zig-zag groove therein to provide a series of angular surfaces, a fixed member having a reaction surface disposed at right angle to the axis of the driven shaft, and a drive member pivotally mounted on said drive shaft including a head, a link pivoted to said head, a pin rotatably mounted in said link, a roller mounted at one end of said pin and disposed in said groove for contact with the series of angular surfaces, a second surface disposed at an angle different from the angle of the reaction surface and from that of the series of angular surfaces, and a second roller mounted on said pin in contact with the second angular surface to impart an angular direction of drive force to said roller.

5. A mechanical movement comprising in combination, a drive shaft, a driven shaft in axial alinement with said drive shaft, a driven element fixed to said driven shaft including a body, a fixed reaction surface disposed at right angle to the axis of the driven shaft against which the driven element rotatably abuts, an annular series of angular plane surfaces provided on said body, adjacent ones of said angular plane surfaces being in reverse angular relation, each of said angular plane surfaces being disposed in a circumferential direction at an angle different than the angle of the fixed reaction surface, a driving element carried by said drive shaft, said driving element including a roller in rolling engagement with the series of angular plane surfaces, and means acting upon the roller upon rotation of the drive shaft for imparting angular planetary movement of the roller over the series of angular plane surfaces, the angular path of planetary movement being on a line whose angle is intermediate the angle of the reaction surface and the plane angular surfaces of the driven element to impart rotation to the driven shaft at a speed differential relative to that of the drive shaft.

HANS WERNER NOWKA.